United States Patent Office 3,405,156
Patented Oct. 8, 1968

3,405,156
PROCESS FOR PRODUCTION OF ISOCYANATES
Eric W. Stern, Mountainside, and Marshall L. Spector, Livingston, N.J., assignors to Pullman Incorporated, Chicago, Ill., a corporation of Delaware
No Drawing. Filed Mar. 10, 1965, Ser. No. 438,721
19 Claims. (Cl. 260—453)

ABSTRACT OF THE DISCLOSURE

A process comprising reacting a saturated aliphatic primary amine or an aromatically unsaturated primary amine with carbon monoxide and a platinum group metal salt to form an isocyanate derivative of the primary amine.

This invention relates to an improved process for the production of isocyanates including aliphatic and aromatic isocyanates.

Polyurethanes constitute a valuable group of industrial polymeric materials, and it is known that they are produced by the polymerization-condensation of isocyanates and polyols. The preparation, properties and applications of the flexible polyurethane foams are described in the literature. It is also known that isocyanates are prepared by reacting a primary amine with phosgene to form the corresponding carbamyl chloride which is then treated with an alkaline medium, or thermally, to form the isocyanate with liberation of hydrogen chloride. For example, toluene di-isocyanates, widely employed in the manufacture of polyurethanes, are produced by first reacting a toluene diamine with phosgene in a solvent such as orthodichlorobenzene at a low temperature such as 5° C. to form the carbamyl hydrochloride followed by further treatment with phosgene at an elevated temperature such as 150° C. to form the di-isocyanate and hydrogen chloride. Among the drawbacks of this method of preparation is that the highly toxic gas, phosgene, is required. Another drawback is that hydrogen chloride is formed as a by-product and cannot be re-used in the process except in the method by which the amine is reacted in the form of its hydrochloride. Even in the latter method, however, three moles of hydrogen chloride are formed for every amino group that is converted to an isocyanate group.

It is an object of this invention to provide a novel method for the production of isocyanates.

Another object is to provide a novel method for producing isocyanates which method does not require the use of phosgene as a reactant.

Another object is to provide an improved method for producing isocyanates including aliphatic and aromatic compounds which method allows for utilization of hydrogen halide by-product such that the loss of chloride value is minimized.

Various other objects and advantages of this invention will become apparent to those skilled in the art from the accompanying description and disclosure.

By the teachings of this invention a novel method for the production of isocyanates is provided which comprises reacting carbon monoxide and an organic compound free of aliphatic unsaturation and containing at least one primary amino group ($-NH_2$), referred to herein as the primary amine reactant, in the presence of a compound of a platinum group metal.

The isocyanate producing reaction which occurs during the process of this invention is represented by the following general equation which sets forth the reactive portions of the reactants:

$$-NH_2 + CO + M^{x+} \rightarrow -NCO + M^0 + 2H^+ \quad (1)$$

In Equation 1, $-NH_2$ and $-NCO$ represent the primary amine reactant and isocyanate product respectively, and M represents any of the platinum group metals, i.e., a Group VIII metal having an atomic number of at least 44 including palladium, platinum, rhodium, iridium, ruthenium and osmium, and $x$ signifies the positive valence of the metal which is usually from 2 to 6. As shown by Equation 1, the carbon monoxide and primary amino radical react to form the isocyanate radical of the organic product, and the platinum group metal is converted to its elemental form. In accordance with one aspect of the teachings of this invention, the process is carried out with regeneration of the platinum group metal to any one of its positive valence states either in situ, i.e., during the course of the main isocyanate producing reaction, or in a separate regeneration step.

Although the amine reactant is free of aliphatic unsaturation such as that present in alkenes, it may be aromatically unsaturated. The amine reactant may contain more than the one reactive primary amino radical and when such polyamines are used, the organic product which is formed has a corresponding number of isocyanate radicals. The general formula for the primary amine reactant is $R-NH_2$ in which R is an organic radical free of aliphatic unsaturation having up to 20 carbon atoms per radical. The R radical may be an alkyl, cycloalkyl, aryl and aralkyl radical, and may be unsubstituted, i.e., a hydrocarbon radical, or substituted with one or more substituents such as a primary amino, halide, nitro, alkoxy, tertiary amino, ester and substituted amido radicals.

One suitable class of aliphatic amines for use in the process of this invention are those having the formula $C_nH_{2n+1}NH_2$ wherein $n$ is an integer preferably from 1 to 20. This class of amines is typically represented by methylamine, ethylamine, n-propylamine, n-butylamine, n-amylamine, n-hexylamine, laurylamine, dodecylamine and corresponding secondary and tertiary isomers thereof such as isopropylamine, t-butylamine, sec-butylamine and isobutylamine. A second class of suitable aliphatic primary amine reactants are the methylene diamines having the formula $H_2N-(CH_2)_y-NH_2$, wherein $y$ is an integer from 1 to 6 such as ethylenediamine, trimethylenediamine, tetramethylenediamine, pentamethylenediamine and hexamethylenediamine. Other suitable aliphatic primary amines include the cycloalkyl amines such as cyclohexyl amine.

The aromatically unsaturated primary amines have the formula, $R'R''-Z-NH_2$, wherein Z is an aryl radical, i.e., a benzene or naphthalene nucleus including alkyl substituted nuclei such as tolyl and xylyl radicals, and R' and R'' are bonded to the carbon atoms of the aromatically unsaturated ring and may be hydrogen, primary amino, halide, nitro, alkoxy, tertiary amino, substituted amido and ester radicals and may be the same or different. Typical examples of suitable aromatically unsaturated primary amines are aniline; 2-methyl-aniline; 3-methyl-aniline; ortho-, meta- and para-methoxyanilines; ortho-, meta- and para-chloroanilines; 2-methoxy-5-chloroaniline; 2-nitro-4-chloroaniline; 5-chloro-2-methylaniline; 2-methoxy-5-methylaniline; para-diaminobenzene; N,N-dimethyl-p-phenylenediamine; toluene-4,6-diamine; toluene-2,6-diamine; toluene-3,6-diamine; toluene-3,4-diamine; benzidine; and naphthyl amines such as 1-aminonaphthalene, 2-aminonaphthalene, 1,8-, 1,4-, 2,3- and 2,6-diaminonaphthalenes. Still another class of suitable primary amine reactants are the aralkyl amines which are typically represented by benzylamine and di-(para-aminophenyl) methane.

In accordance with the process of this invention, the amine reactant and carbon monoxide are brought into contact in the presence of a compound of a platinum group metal, the latter term being defined herein as a metal of group VIII of the Periodic Table having an atomic number of at least 44 including palladium, platinum, ruthenium, iridium, rhodium, osmium and mixtures thereof. Since it is the platinum group metal portion of the molecule which is required in the process of this invention, any compound thereof is suitable. Typical examples of the platinum group metal compounds which can be used in carrying out the process of this invention are: the inorganic salts such as the halides including fluorides, chlorides, bromides and iodides; sulfates; nitrates; cyanides; phosphates, perchlorates; complex salts such as those consisting of an alkali metal, halogen and the platinum group metal; organic salts such as the acetates, formates, propionates and oxalates; and organic and inorganic coordination complex compounds such as ammino, nitro, nitroso, olefin, CO, and nitrile containing coordination salts. Compounds of the platinum group metal in which the metal is present in any of its valence states are suitable. The preferred Group VIII metal salts are the halides, represented by the general formula $MX_x$, in which M is one of the aforesaid Group VIII metals, X is any of the halogens (F, Cl, Br, I), and $x$ is an integer from 2 to 6. The Group VIII metal salt may be unsupported, or it may be used in combination with a support, carrier or diluent, typical examples of which are alumina, silica gel, celite, Alundum, metal aluminosilicates including the synethic crystalline alkali metal and alkaline earth metal aluminosilicates known in the art as molecular sieves. Typical examples of suitable Group VIII metal compounds are: palladous chloride, palladous bromide, palladous iodide, palladous cyanide, palladium dinitrate, palladium trifluoride, palladium acetate, tetramminepalladium chloride, platinous chloride, platinous bromide, platinous cyanide, platinum tetrafluoride, platinum tetrachloride, platinum tetrabromide, sodium choropalladite, potassium chloroplatinate, potassium chloropalladite, nitrosylchloroplatinic chloride, rhodium trichloride, rhodium trisulfate, ruthenium trichloride, ruthenium tribromide, ruthenium disulfate, potassium ruthenocyanide, osmium dichloride, osmium tetrachloride, potassium chloroosmite, iridium trichloride, iridium tribromide and iridium trifluoride. Although any of the Group VIII noble metals may be used the palladium compounds are preferred. For convenience, the following discussion is largely made specific to the use of palladium chloride, but it is to be understood that such specific teachings also apply to the use of the other Group VIII metal salts.

The process of this invention is conducted by contacting the primary amine reactant in either the vapor or liquid phase with carbon monoxide in the presence of one or more of the aforesaid platinum group metal compounds. Also included within the scope of this invention is the use of the amine or carbon monoxide reactants in the form of their respective preformed complex with the platinum group metal compound. The reaction may be carried out over a relatively wide range of temperature and pressure conditions without departing from the scope of this invention. Generally, the temperature of reaction will be above the freezing point of the particular reaction mixture and below the decomposition temperature of the reactants and product. Thus, the reaction temperature may range between about minus 20° F. and about 500° F., and more usually between about 32° F. and about 300° F. The process is carried out at at least atmospheric pressure, the total operating pressure ranging between about 0 and about 5000 pounds per square inch gauge (p.s.i.g.). Usually the process is carried out at a total pressure between about 5 and about 1000 p.s.i.g.

The relative concentration of amine and carbon monoxide may vary over a wide range and a molar excess of either reactant may be employed. However, from the standpoint of suppressing side reactions such as the further reaction of isocyanate product with excess amine reactant to form a urea derivative, it is desirable to operate using at least a stoichiometric amount of carbon monoxide, i.e., at least 1 mole of carbon monoxide per amino group of the amine reactant. In order to minimize reaction of the isocyanate product with amine to produce the corresponding substituted urea, the process is preferably effected when the mole ratio of carbon monoxide relative to each primary amino group is greater than one, the presence of an excess of carbon monoxide not interfering with the formation or recovery of the isocyanate product. In order to facilitate the recovery of the isocyanate product as such before it undergoes further reaction to form a substituted urea, the isocyanate is removed from the system as it is formed such as, for example, by operating above the boiling point of the isocyanate.

The process may be carried out in batchwise or continuous systems without departing from the scope of the teachings of this invention. The reaction may be effected in the presence of liquid diluents or solvents in which the reactants are dissolved or dispersed by mechanical agitation or other means. Suitable solvents include nonpolar organic liquids such as saturated hydrocarbons such as isooctane, cyclohexane, pentane, etc.; and aromatics such as benzene, xylene, toluene, and alpha-methylnaphthalene. The preferred solvents are polar organic solvents including: ethers such as ethyl ether, diphenyl ether, tetrahydrofuran, dioxane, 1,2-dimethoxyethane, diethylene glycol diethyl and dimethyl ethers; amides such as dimethylformamide, dimethylacetamide, N-methylacetamide and N-methylpyrrolidone; sulfoxides and sulfones such as dimethylsulfoxide and dimethylsulfone; gamma-butyrolactone; nitrobenzene; nitriles such as benzonitrile and acetonitrile; esters such as ethyl acetate and alkyl propionates; ketones such as acetone, methyl ethyl ketone and acetophenone; and halogenated liquids such as chlorobenzene and chloroform.

In order to minimize the conversion of carbon monoxide to carbon dioxide, the process is preferably conducted under substantially anhydrous conditions, i.e., at a water content less than 1 mol percent, based on the amount of carbon monoxide fed to the reaction zone. However, the use of less than substantially anhydrous conditions is within the scope of the present invention since the presence of water does not prevent the formation of desired isocyanate product. However, the latter is the less economical type of operation in view of the fact that carbon monoxide, in addition to reacting with the primary amine, also reacts with water in the presence of platinum group compounds to form carbon dioxide.

An illustrative equation representing the reaction of the presently described process is as follows in which palladium dichloride is used to typically represent the platinum group metal compound:

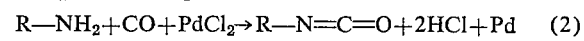

R—$NH_2$+CO+$PdCl_2$→R—N═C═O+2HCl+Pd    (2)

wherein the R group is an organic radical as previously described. When the amine is a di-amine, such as toluene-2,6-diamine, each of the amino groups is inverted to an isocyanate group to produce toluene-2,6-diisocyanate according to the following illustrative equation:

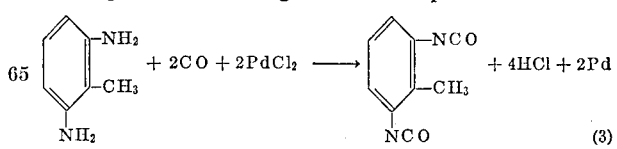

It is also within the scope of the present invention to react the amine in the form of its hydrochloride salt according to the following illustrative equation:

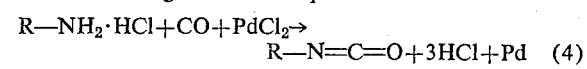

R—$NH_2$·HCl+CO+$PdCl_2$→
      R—N═C═O+3HCl+Pd    (4)

wherein R is as above defined.

As shown by the above equations, the hydrogen bonded to the nitrogen of the primary amino groups reacts with the halogen of the platinum group metal halide to form hydrogen halide and the platinum group metal is reduced to a lower valence state including the elemental metal form. The process may be effected in the presence of a hydrogen halide acceptor such as: phosphates including the alkali metal and alkaline earth metal phosphates and hydrogen phosphates typical examples of which are calcium phosphate, sodium dihydrogen phosphate, sodium monohydrogen phosphate and ammonium phosphate; the alkali metal carboxylates such as sodium, lithium and potassium acetates; carbonates; and molecular sieves of the above-described type which also may function as a carrier for the platinum group metal compound. When an excess of amine is employed it functions as the hydrogen halide acceptor forming the corresponding hydrochloride salt, but, as stated above, it is usually preferred to avoid the presence of excess amine reactant.

In providing an economically feasible process, the platinum group metal is maintained in a positive valence state by regeneration in situ, i.e., during the course of the isocyanate producing reaction, or in a separate regeneration step. One method of regeneration comprises reacting the platinum group metal with hydrogen halide and an oxygen-containing gas according to the following illustrative equation:

$$Pd + \tfrac{1}{2}O_2 + 2HCl \rightarrow PdCl_2 + H_2O \qquad (5)$$

The term "oxygen-containing gas" as used herein includes air, substantially pure molecular oxygen, as well as oxygen diluted with an inert gas such as nitrogen or helium, and containing at least 10 mol percent oxygen. This method of regeneration is carried out at an elevated temperature of between about 50° F. and about 400° F., and more usually at a temperature between about 75° F. and about 250° F., at a pressure between about 15 and about 1000 p.s.i.g. The mol ratio of oxygen to hydrogen halide ranges between about 1:2 and about 1:10. The source of the hydrogen halide employed in the regeneration step may be any extraneous source and is usually the hydrogen halide produced as a second product of the main isocyanate forming reaction. When necessary, hydrogen halide from an external source may be used. The reaction of Equation 5 can be effected with or without passage of the primary amine and carbon monoxide reactants through the reaction zone. For example, the oxygen-containing gas can be passed continuously or intermittently through the reaction zone while feeding the primary amine and carbon monoxide thereto. In accordance with this latter method, the platinum group metal is substantially maintained in its halide form, i.e., the elemental form of the metal is oxidized substantially instantaneously, and halide value is supplied by the hydrogen halide generated in situ. Alternatively, the regeneration can be carried out as a separate step without passage of amine and carbon monoxide through the reaction zone, or in a separate regeneration zone. Also included within the scope of this invention is the use of two or more reactors such that the reaction between the amine and carbon monoxide is effected in one reactor and, when it appears that the platinum group metal compound has been substantially converted to the metal, the flow of reactants to this reactor is stopped and the reactants passed to a second reactor containing the platinum group metal salt. The platinum group metal in the first reactor is then treated with oxygen and hydrogen halide to regenerate the halide salt after which the reactants are passed therethrough once again. By so conducting the process in this manner, a continuous, regenerative process is provided.

Another method of effecting regeneration of the Group VIII metal salt comprises reacting the noble metal with a compound of a dissimilar metal having a variable valence and present in its higher oxidation state, more particularly compounds of polyvalent metals which are readily reduced to a lower valence state. Typical examples of such compounds are the halides and acetates of copper, mercury, cerium, tantalum, tin, lead, titanium, vanadium, antimony, chromium, tungsten, molybdenum, manganese, iron, cobalt, nickel and thallium. Thus, for example, palladium chloride may be regenerated from the elemental form by interacting the latter with chloride of the aforesaid metals of which cupric chloride and ferric chloride are usually preferred. Thus, when palladium is interacted with cupric chloride, the reaction proceeds as follows:

$$Pd + 2CuCl_2 \rightarrow PdCl_2 + 2CuCl \qquad (6)$$

The cupric halide type regenerating agent can be present during the course of the main reaction in which case the platinum group metal is regenerated simultaneously with the formation of isocyanate product. The cupric halide type component is present in an amount such that the atomic ratio of platinum group metal to copper (or other polyvalent metal) is between about 1:10 and about 1:10,000. The cupric halide type component is maintained in its highest oxidation state without interrupting the main reaction and regeneration of platinum group metal, by passing an oxygen-containing gas through the reaction zone as described above in connection with oxygen regeneration of the noble metal, according to the following equation:

$$2CuCl + \tfrac{1}{2}O_2 + 2HCl \rightarrow 2CuCl_2 + H_2O \qquad (7)$$

Still another method of maintaining the platinum group metal in one of its positive valence states comprises effecting the reaction between the primary amine and carbon monoxide in the presence of a quinone such as benzoquinone or anthraquinone.

Internal regeneration of the noble metal compound, i.e., regeneration during the course of the reaction between the amine and carbon monoxide by any one of the above reactions has several advantages. One is that hydrogen halide by-product is utilized as it is formed thereby facilitating the work-up of products and minimizing the amount of hydrogen halide necessarily separated from the reaction zone effluent. Another advantage is that a less than stoichiometric overall amount of the noble metal compound is required since it is maintained in its reactive positive valence state, i.e., in other than its elemental form. On the other hand, when separate stage regeneration is used, the isocyanate producing reaction must either be interrupted to regenerate the active form of the noble metal, or a second reactor is required thereby increasing the overall amount of noble metal compound and requiring more extensive apparatus to provide a commercial, continuous process.

The regeneration techniques of Equations 5–7 above, involve conversion or maintenance of the platinum group metal in the form of a halide and usually in the form of chloride. Although the platinum group metal compound may initially be charged to the reaction zone in the form of an acetate, nitrate, etc., it is converted to halide during the aforesaid regeneration reactions. Thus, the term "platinum group metal halide" as used herein is intended to include the addition of the halide to the reaction zone as such as well as platinum group metal halide which is formed during the course of either in situ or separate regeneration.

The following examples are offered as a better understanding of the present invention and are not to be construed as unnecessarily limiting thereto.

Example I.—Preparation of n-butylisocyanate

A mixture consisting of 4.43 grams (0.025 mol) of palladous chloride and 5.89 grams (0.041 mol) of disodium hydrogen phosphate was heated in a 250 ml. round bottom flask connected to a gas manifold at a temperature of 200° F. under vacuum for approximately 16 hours. After cooling to room temperature (72° F.), 50 ml. of absolute 1,2-dimethoxyethane was injected through a side arm closed by a rubber serum cap. There were then added 2.61 ml. (0.025 mol) of n-butylamine dissolved in 20 ml. of 1,2-dimethoxy-ethane, the n-butylamine having been distilled and stirred over a molecular sieve. After stirring the mixture magnetically for one hour, carbon monoxide was admitted to a pressure of 300 mm. gauge. After one hour of stirring, the temperature was raised to 150° F. Decreases in pressure were noted and the system was repressured periodically with carbon monoxide to pressures ranging from 145 to 260 mm. gauge. Samples of the reaction mixture were withdrawn periodically and analyzed by vapor phase chromatography and infrared spectroscopy. After one hour and 45 minutes of operating at a temperature of 150° F., the presence of n-butylisocyanate was indicated and successive samples showed increasing amounts of this product. The solids in the reaction flask also became progressively more black indicating reduction of the palladous chloride to elemental palladium. After 48 hours of operating at 150° F., the reaction mixture was cooled to room temperature. Analysis of a sample withdrawn at that time showed that the n-butylisocyanate content of the liquid phase in the reaction flask was 2 volume percent, constituting an isocyanate product yield of 49.2 mole percent.

That n-butylisocyanate had been produced was further confirmed by converting it to di-n-butylurea. This was accomplished by treating the liquid product with 1.8 ml. n-butylamine and stirring for one-half hour. Infrared analysis showed that this eliminated n-butylisocyanate and resulted in the formation of di-n-butylurea. The mixture was then filtered and the solids were washed with several portions of 1,2-dimethoxyethane solvent. The solvent was removed from the combined filtrate and washings under vacuum, and the residue was dissolved in ether, extracted with aqueous sodium cyanide, dried over anhydrous magnesium sulfate, air filtered and stripped. The purified solid (2.59 grams) was recrystallized from ethanol/ether yielding a total of 2.34 grams of white crystalline material shown to be identical with an authentic sample of di-n-butylurea by melting point and infrared spectrum. Total yield of the purified di-n-butylurea was 54.4 mole percent, based on palladium dichloride.

Example II.—Preparation of phenylisocyanate

The procedure employed in this example was the same as that of the above Example I. Thus after the flask containing the mixture of palladous chloride (0.025 mol) and disodium hydrogen phosphate (0.041 mol) had been evacuated, 50 ml. of 1,2-dimethoxyethane was injected followed by the addition of 2.27 ml. (0.25 mol) of aniline dissolved in 20 ml. of 1,2-dimethoxyethane, the aniline having been distilled and stored over a molecular sieve. Carbon monoxide was then admitted to an initial carbon monoxide pressure of 60 mm. gauge. After stirring the reaction mixture for 1.5 hours at room temperature (72° F.), the presence of phenylisocyanate was shown by infrared spectroscopy. The mixture was then heated to 150° F. and stirred at this temperature for a total of 24 hours and then at 175° F. for 96 hours. During this time, the solids in the flask assumed a black color and the presence of phenylisocyanate in increasing amounts was shown by analysis of periodic samples by both infrared spectroscopy and vapor phase chromatography. Carbon monoxide was absorbed throughout the reaction period and the system was repressured periodically to pressures ranging from 121–288 mm. gauge. Final vapor phase chromatographic analysis of the reaction mixture showed a phenylisocyanate content of 2.1 volume percent constituting a 53.4 mole percent yield. Treatment of the mixture with additional aniline (1.5 ml.) resulted in the conversion of the phenylisocyanate product to diphenylurea. The mixture was filtered, the solids washed with 1,2-dimethoxyethane, and the combined washings and filtrate stripped under vacuum. The residual solid (3.7 grams) was recrystallized from ethanol yielding 2.67 grams of white crystalline material identical with an authentic sample of diphenylurea in melting point and infrared spectrum. Total yield of the purified diphenylurea was 50.2 mol percent, based on palladium chloride.

Example III.—Preparation of phenylisocyanate

To a 250 ml. flask fitted with a dropping funnel, a Vibromix stirrer, a gas inlet and a reflux condenser there were added 4.43 grams (0.025 mol) of palladous chloride and 5.89 grams (0.041 mol) of disodium hydrogen phosphate both of which had been dried under vacuum at 212° F. Dry nitrogen was passed through the flask overnight (approximately 16 hours) after which 60 ml. of absolute 1,2-dimethoxyethane were added. Agitation of the reaction mixture was then begun and the nitrogen flow was replaced with carbon monoxide adjusted to a flow rate of 0.6 cubic feet per hour. The solvent was brought to reflux temperature and 2.27 ml. (0.025 mol) of aniline in 40 ml. of 1,2-dimethoxyethane were added dropwise oved a period of three hours, the aniline having been previously distilled and stored over a molecular sieve. Reaction conditions were maintained for an additional eighteen hours during which time the solids in the flask assumed a black color. Vapor phase chromatographic and infrared spectroscopic analysis of samples withdrawn during this period showed the presence of phenylisocyanate product. After addition of sufficient 1,2-dimethoxyethane to compensate for evaporation of solvent, the mixture was analyzed by vapor phase chromatography and was shown to contain 1.8 volume percent phenylisocyanate which constitutes a yield of 68 mol percent of the phenylisocyanate, based on palladium chloride.

Example IV.—Preparation of toluene-2,4-diisocyanate

The procedure employed in this example was essentially the same as that of the above Example III. Thus a mixture of 4.43 grams of palladous chloride (0.025 mol) and 5.89 grams (0.041 mol) of disodium hydrogen phosphate contained in the reaction flask was flushed with dry nitrogen overnight (approximately 16 hours). There were then added 100 ml. of absolute 1,2-dimethoxyethane which had been previously distilled and purged with dry nitrogen overnight. Dry nitrogen was then passed over the mixture for 24 hours followed by introduction of carbon monoxide for an additional 24 hours with intermittent stirring. A solution containing 1.8 grams (0.015 mol) of toluene-2,4-diamine in 100 ml. of 1,2-dimethoxyethane was purged with dry nitrogen for 48 hours, the toluene-2,4-diamine having been recrystallized 4 times from benzene. The diamine solution was then added dropwise to the reaction flask over a period of two hours. During this two hour period, conversion of the palladous chloride to metallic palladium was observed. Stirring was continued for an additional one-half hour after which the mixture was analyzed by vapor phase chromatography and shown to contain 0.25 gram of toluene-2,4-diisocyanate which constitutes a yield of 9.6 mol percent, on the basis of toluene-2,4-diamine.

Example V.—Preparation of isopropylisocyanate

To a reaction vessel attached to a gas manifold there were added 2 grams of dried palladous chloride and, after evacuation of the vessel, 50 ml. of purified 1,2-dimethoxyethane was injected. The apparatus was pressured to 1 atmosphere gauge with carbon monoxide, disconnected from the manifold and shaken for 24 hours at room temperature (72° F.) during which time the vessel was repressured with carbon monoxide several times, the solution assuming a deep yellow color. Thereafter, 1 ml. of isopropylamine (previously dried over potassium hydroxide) was injected. The addition of the amine caused immediate reaction and an initially black precipitate formed, the solution being dark brown. The formation of the isocyanate product was shown by infrared analysis of a sample of the liquid product.

It is to be understood that when the above Examples I–V are repeated using the other primary amines defined herein, the corresponding isocyanates are formed. For example, when the procedure of Example IV is repeated using toluene-2,6-diamine in place of the 2,4-diamine, toluene-2,6-diisocyanate is produced. Similarly, when hexamethylene diamine is used, hexamethylene diisocyanate is produced.

Although the exact mechanism of the isocyanate producing reaction described herein is not fully understood in the sense that it is unknown whether the reaction proceeds via an intermediate complex between the carbon monoxide and platinum group metal compound, it is known that the reaction between these two compounds and the primary amine does not proceed via intermediate formation of phosgene. For example, in a separate experiment palladous chloride (17.7 grams, 0.1 mol) was added to a reactor column packed with glass helices and fitted with a thermowell and an outer heating coil. Carbon monoxide was then passed through the reactor column at a flow rate of approximately 40 cc. per minute for a total of about 2.5 hours during which period the internal temperature was raised gradually from 40° C. to 190° C. During this time, there was no detectable formation of phosgene.

It is apparent from the above teachings that a novel process is provided for producing aliphatic and aromatic isocyanates by the reaction between carbon monoxide and a primary amine in the presence of a platinum group metal compound, and it is to be understood that various modifications and alterations of the method for effecting the process may become apparent to those skilled in the art without departing from the scope of this invention.

Having described our invention, we claim:

1. A process which comprises reacting a primary amine with carbon monoxide and a platinum group metal compound, said amine being selected from the group consisting of a saturated aliphatic primary amine and an aromatically unsaturated primary amine, to produce an isocyanate from said amine.

2. The process of claim 1 in which said amine has from 1 to 20 carbon atoms and from 1 to 2 primary amino groups per molecule.

3. The process of claim 1 in which said primary amine has the formula, R—$NH_2$ in which R has from 1 to 20 carbon atoms per radical and is selected from the group consisting of an alkyl, cycloalkyl, aryl and aralkyl radical.

4. The process of claim 1 in which said saturated aliphatic amine has the formula, $C_nH_{2n+1}NH_2$ in which $n$ is an integer from 1 to 20.

5. The process of claim 1 in which said aliphatic amine is a methylene diamine having the formula,

$H_2N—(CH_2)_y—NH_2$ in which $y$ is an integer from 1 to 6.

6. The process of claim 1 in which said aromatically unsaturated amine is a toluene diamine.

7. The process of claim 1 in which said platinum group metal compound is a platinum group metal halide.

8. The process of claim 1 in which said platinum group metal compound is a palladium salt.

9. A process which comprises reacting a primary amine with carbon monoxide and a platinum group metal salt at a temperature between about 32° F. and about 500° F. under substantially anhydrous conditions, said amine having from 1 to 20 carbon atoms per molecule and being selected from the group consisting of saturated aliphatic and aromatically unsaturated mono- and di-primary amines, to form an isocyanate from said amine.

10. The process of claim 9 in which said platinum group metal salt is a palladium salt.

11. A method for producing isocyanates which comprises reacting a primary amine selected from the group consisting of a saturated aliphatic primary amine and an aromatically unsaturated primary mine with carbon monoxide and a platinum group metal compound at a temperature within the range of between about minus 20° F. and about 500° F., thereby converting said amine to an isocyanate and platinum group metal undergoing reduction to its elemental form.

12. A method for producing isocyanates which comprises reacting a primary amine selected from the group consisting of a saturated aliphatic primary amine and an aromatically unsaturated primary amine, with carbon monoxide and a platinum group metal compound at a temperature within the range of between about minus 20° F. and about 500° F. and in the presence of an oxidizing agent for maintaining platinum group metal in a positive valence state, to produce an isocyanate.

13. A process which comprises reacting a toluene primary diamine with carbon monoxide and a palladium chloride at a temperature between about —20° F. and about 500° F. to produce a toluene diisocyanate as a product of the process.

14. The process of claim 13 in which said diamine is toluene-2,4-diamine.

15. The process of claim 13 in which said diamine is toluene-2,6-diamine.

16. A process which comprises reacting aniline with carbon monoxide and a palladium chloride at a temperature between about —20° F. and about 500° F. to produce phenylisocyanate as a product of the process.

17. A process which comprises reacting a primary amine having from 1 to 20 carbon atoms per molecule with carbon monoxide and a palladium salt at a temperature from about 32° F. to about 500° F., said amine having from 1 to 2 primary amino groups bonded to a radical selected from the group consisting of alkyl, cycloalkyl, aryl and aralkyl radicals, to produce an isocyanate from said amine.

18. The process of claim 17 in which said amine is n-butylamine.

19. The process of claim 17 in which said amine is isopropyl amine.

References Cited

UNITED STATES PATENTS 3,070,618   12/1962   Drummond _____ 260—453

CHARLES B. PARKER, *Primary Examiner.*

D. H. TORRENCE, *Assistant Examiner.*

PO-1050
(5/69)

UNITED STATES PATENT OFFICE
CERTIFICATE OF CORRECTION

Patent No. 3,405,156      Dated October 8, 1968

Inventor(s) Eric W. Stern and Marshall L. Spector

It is certified that error appears in the above-identified patent and that said Letters Patent are hereby corrected as shown below:

Column 3, line 28, for "synethic" read --synthetic--. Column 4, line 59, for "inverted" read --converted--. Column 6, line 8, for "chloride" read --chlorides--. Column 7, line 51, for "0.25" read --0.025--. Column 10, line 16, for "mine" read --amine--.

Signed and sealed this 12th day of October, 1971.

(SEAL)
Attest:

EDWARD M. FLETCHER, JR.
Attesting Officer

ROBERT GOTTSCHALK
Acting Commissioner of Patents